United States Patent [19]
Hwong et al.

[11] Patent Number: 5,432,896
[45] Date of Patent: Jul. 11, 1995

[54] WATERCOLOR SIMULATION IN COMPUTER GRAPHICS

[75] Inventors: Yao D. Hwong, Tustin; Chin-an Cheng, San Pedro; Ming T. Su, Riverside, all of Calif.

[73] Assignee: AXA Corporation, Irvine, Calif.

[21] Appl. No.: 648,631

[22] Filed: Jan. 31, 1991

[51] Int. Cl.⁶ ............................................. G06T 5/20
[52] U.S. Cl. ................................. 395/129; 395/155
[58] Field of Search .................... 395/129, 130–132; 340/739, 728

[56] References Cited

U.S. PATENT DOCUMENTS 4,524,421 6/1985 Searby et al. ................. 364/521
4,633,416 12/1986 Walker ........................ 395/131

OTHER PUBLICATIONS

Bill Snider et al, "SuperPaint", 1987, 1 copied page.
Microsoft Corporation, "Microsoft Paintbrush User's Guide", 1989, pp. 11–14, 24–27, 94–96 & 122.
Macguide Magazine, "Studio 8 is Enough", Apr. 1989, p. 63.
Froissart, "Artist get graphics Oasis from Time Arts", Oct. 1990, p. 45.

Primary Examiner—Heather R. Herndon
Assistant Examiner—Mike Smith
Attorney, Agent, or Firm—Harry G. Weissenberger

[57] ABSTRACT

Watercolor effects are simulated in computer graphics by defining a brush shape and brush type, selecting a wetness level for the drawing area and, in accordance with the selected wetness level, causing the brush stroke to merely interpolate the brush color with the pre-existing color in the stroked area, create a texture effect of diminishing brush color, or create a smearing effect by interpolating the pre-existing color at a new brush position with that of the previous brush position before interpolating it with the brush color. Apparatus is also disclosed for selecting various brush attributes and brush color parameters.

20 Claims, 7 Drawing Sheets

WATERCOLOR SIMULATION IN COMPUTER GRAPHICS

FIELD OF THE INVENTION

This invention relates to the creation of color graphics on a computer, and more particularly to a method of creating effects capable of simulating the appearance of watercolor painting.

BACKGROUND OF THE INVENTION

Many systems exist by which a graphic artist can produce drawings on a computer screen with sophisticated effects such as shading, stippling, and painting-like color variations. It has not been previously possible, however, to produce on a computer screen the visual effects which an artist would expect to see as he works in watercolor media. For example, in watercolor painting, the appearance of a brush stroke is dependent upon such factors as the humidity and color of the paper, the dilution and quantity of the paint, the material and texture of the brush, and the smearing, bleeding and mixing of colors when applied to wet paper.

SUMMARY OF THE INVENTION

The present invention makes it possible for a watercolor artist to electronically paint on a computer screen in the same manner and with the same techniques as he would use on paper. The invention gives the artist the "feel" of drawing on wet paper with familiar watercolor media by combining three features: a) the ability to premix colors on a palette; b) the ability to reproduce the behavior of various brush materials and brush textures as the brush runs out of paint toward the end of a brush stroke; and c) the ability to simulate the smearing effect of a brush being drawn over a still wet previously drawn color on paper with water content. All of these abilities are achieved by the continual recalculation of all screen pixels lying within the brush pattern at any given time during the brush stroke, in accordance with algorithms more specifically described in this specification. The variables used by these algorithms are the brush, color and paper parameters selected by the artist.

DESCRIPTION OF THE PREFERRED EMBODIMENT

Figure 1:
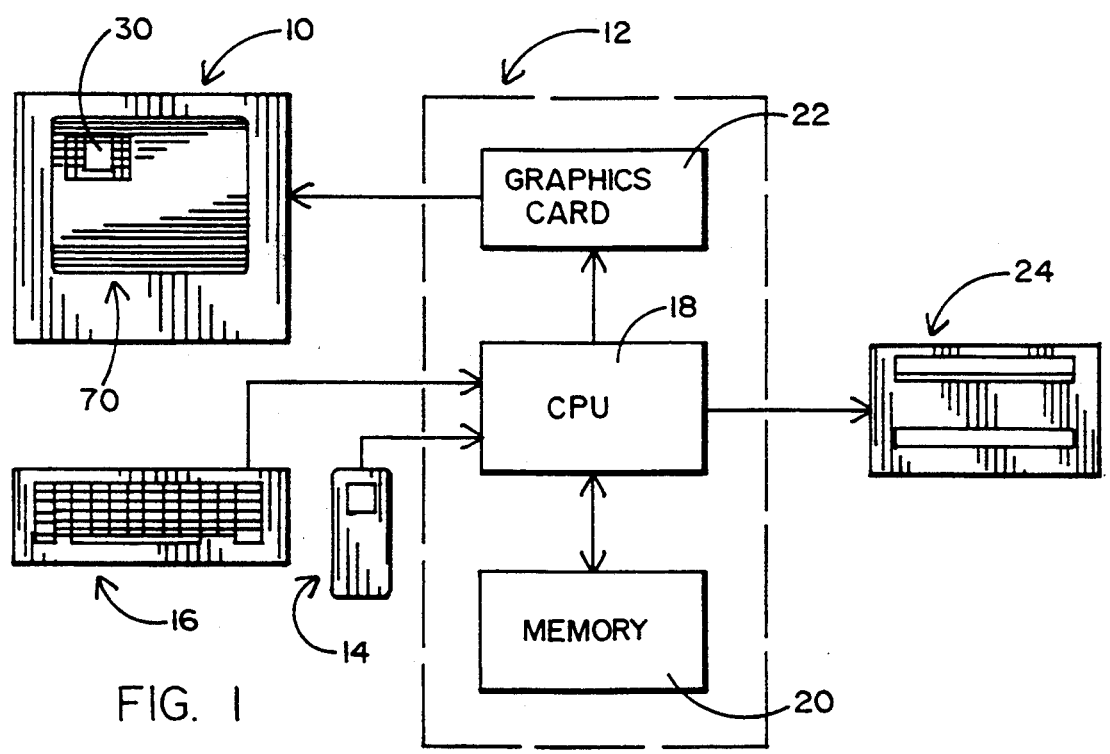
FIG. 1 is a schematic view illustrating the equipment involved in carrying out the invention.

FIG. 1 shows the equipment used in carrying out the present invention. The simulated watercolor drawing is drawn on a monitor 10 by a computer 12 under the control of a mouse or other x-y coordinate tool 14 and a keyboard 16. The computer 12 contains the usual central processing unit 18 for calculating the pixels of the image on the screen of monitor 10, the usual memory 20 for storing image and program information, and a graphics card 22 for conveying image information to the monitor 10. When the artist is satisfied with the image as shown on monitor 10, it can be printed out on the conventional graphics-quality printer 24 or saved on disk.

Figure 2:
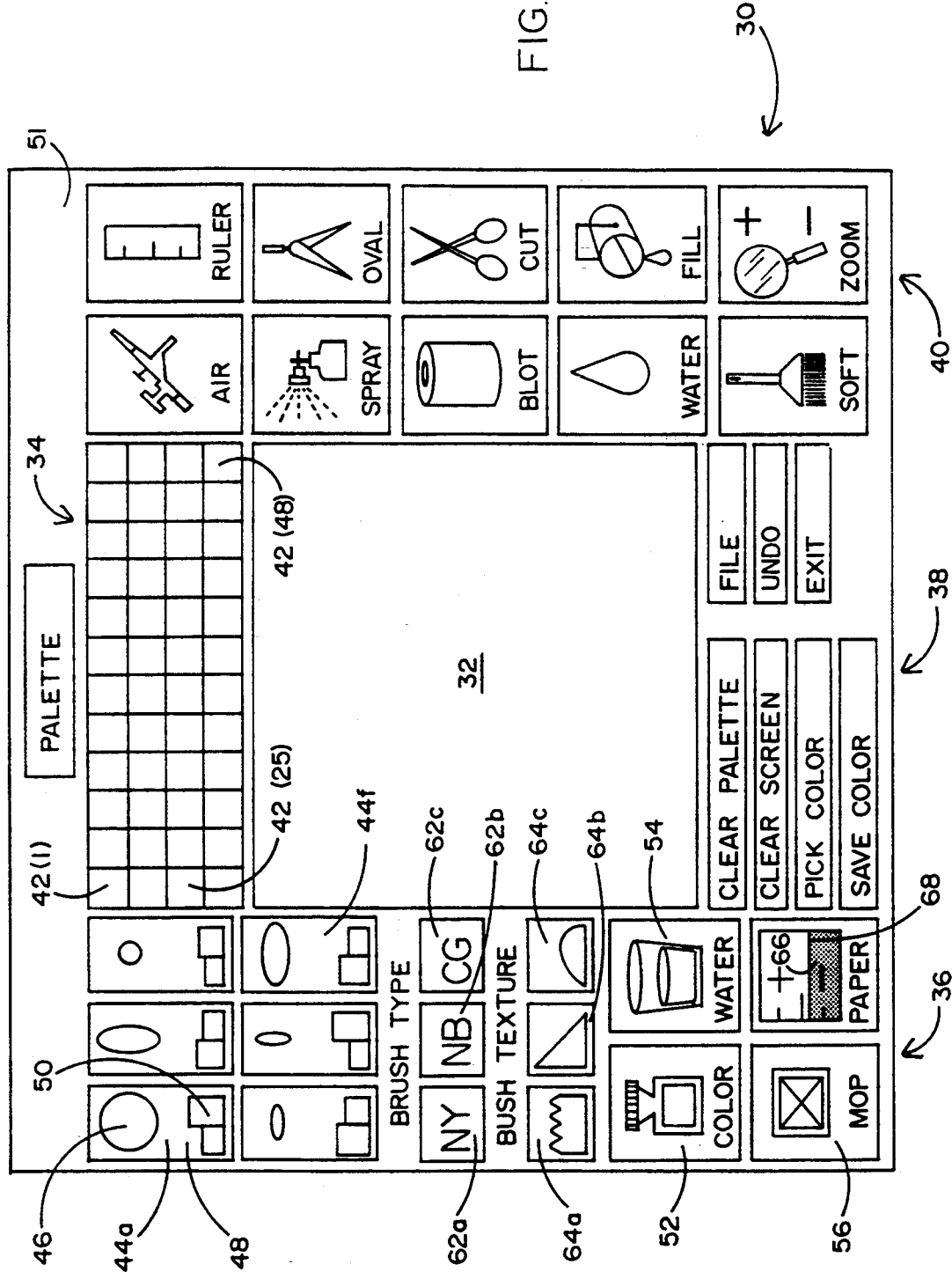
FIG. 2 is a representation of the selection block displayed on the monitor screen when using the invention.

FIG. 2 shows the selection block 30 which allows the artist to select the various brush, color and paper parameters that are available in the system. The selection block 30 may be kept displayed in a convenient out-of-the-way location on the screen of monitor 10, as shown in FIG. 1, or it may be hidden by appropriate operator commands when not in use.

The selection block 30 contains five sections: the palette 32 on which colors are mixed as described hereinafter; the color selector 34; the brush and paper selector 36; the control panel 38; and the special effects controls 40. The special effects controls 40 are not material to this invention and are not further discussed herein. All selections in the selection block 30 may be made in the conventional manner by using the mouse 14 to point to the desired icon and clicking on it.

The palette 32 represents an area of dry white paper on which colors can be mixed. In the preferred embodiment, the palette 32 is essentially white, i.e. if the three primary colors red, blue and green each have, for example, thirty-two intensity levels (levels zero to thirty-one), all three primary colors are at level thirty.

In the preferred embodiment, the color selector 34 contains forty-eight blocks 42(1) through 42(48) of basic colors. Preferably, the upper twenty-four of these are system-defined, while the lower twenty-four can be user-defined as described below. The default color is preferably a slightly-less-than-full white (e.g. all three primary colors at level thirty) which is descernible on the palette 32 but not significantly different therefrom.

The brush selector 36 makes available to the artist a number (e.g. six) of different brushes 44a through 44f. Each brush has three selectable parameters: the brush shape identified by the shape icon 46, which by successive mouse clicks can be cycled through a variety of sizes and shapes such as flat, horizontal or vertical oval, or round; the water content identified by height of the water icon 48; and the color content identified by the height of the color icon 50. The color of the currently selected brush is also disclosed in the color bar 51.

The water or color quantity stored in any of the brushes 44a–44f can be increased in increments by selecting the desired brush icon such as 44f, and then clicking on the add-color icon 52 and/or the add-water icon 54 as necessary. Clicking on the mop icon 56 decrements both the water content and the color content of the selected brush. In the system's pixel computation algorithms, which will be described below, the color content of a brush affects the intensity level of the color in its stroke, and the water content affects both the color intensity level and the number of iterations of the brush stroke algorithm (i.e. the greater the water content, the lighter the color but the longer the stroke before the brush runs out of paint).

The brush selector 36 may also make available several selectable brush types 62a–62c and textures 64a–64c. In the preferred embodiment, the available brush types are NYlon, Natural Bristle, and Computer Graphic. The nylon brush holds less water and color than the natural bristle brush, hence its selection increases the rate at which the paint content of the brush is decremented during each iteration of the brush stroke algorithm. Conversely, the computer graphic brush never runs out of paint, hence its selection disables the decrementing of the paint content by the stroke algorithm.

Figure 3A:
FIG. 3a–c illustrate various brush textures produced by the invention.
Figure 3B:
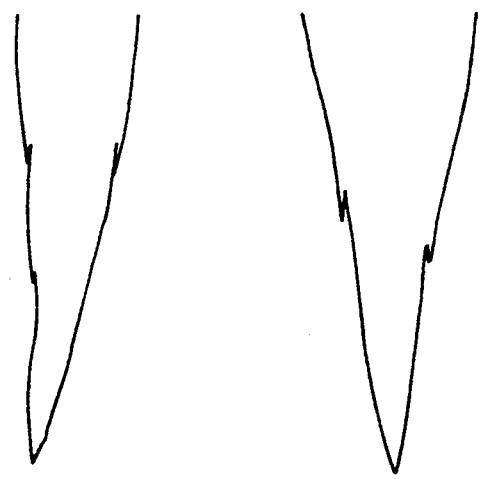
Figure 3C:

The texture icon 64a, when selected, produces a streaking effect when the brush starts to run out of paint (FIG. 3a) by decrementing alternate pixels less than their neighbors; texture icon 64b decrements pixels increasingly from one side of the brush to the other, producing a pointed effect to one side of the stroke (FIG. 3b); and texture icon 64c decrements pixels increasingly on each side of the center pixel for a pointed effect in the center of the stroke (FIG. 3c).

The paper icon 66 controls the wetness characteristic of the simulated watercolor paper. Clicking in its + area increases the wetness, clicking in the − area decreases it. The water level line 68 shows the current wetness. In the preferred embodiment, there are four wetness levels: very wet, wet, moist, and dry. The wetness level determines the brush stroke algorithm (plain, texture, smearing, or bleeding, all explained below) in accordance with the following table:

TABLE I

| Water | Paper Color | Very Wet | Wet | Moist | Dry |
|---|---|---|---|---|---|
| Very Wet | High | Bleeding | Smearing | Texture | Solid color |
| Wet | High | Bleeding | Smearing | Texture | Solid color |
| Moist | High | Bleeding | Smearing | Texture | Solid color |
| Dry | High | Bleeding | Smearing | Texture | Solid color |
| Very Wet | Medium | Bleeding | Smearing | Texture | Solid color |
| Wet | Medium | Bleeding | Smearing | Texture | Solid color |
| Moist | Medium | Bleeding | Smearing | Texture | Solid color |
| Dry | Medium | Bleeding | Smearing | Texture | Solid color |
| Very Wet | Low | Bleeding | Smearing | Texture | Solid color |
| Wet | Low | Bleeding | Smearing | Texture | Solid color |
| Moist | Low | Bleeding | Smesaring | Texture | Solid color |
| Dry | Low | Bleeding | Smearing | Texture | Solid color |
| Very Wet | None | B/G Bleeding | B/G Smearing | B/G Texture | Solid color |
| Wet | None | B/G Bleeding | B/G Smearing | B/G Texture | Solid color |
| Moist | None | B/G Bleeding | B/G Smearing | B/G Texture | Solid color |
| Dry | None | B/G Bleeding | B/G Smearing | B/G Texture | Solid color | where B/G is the background color of the drawing area of screen 70. The background color is set by clicking "clear screen" in the control block 38, followed by choosing either the default color or the current color in the color bar 51, by means of a dialog box (not shown) which appears when "clear screen" is clicked.

In making a brush stroke on the palette 32 or on the screen 70 of monitor 10 in general, the pixels of a pixel block large enough to accommodate the largest brush shapes (e.g. sixteen by sixteen pixels), and centered upon the brush position at the start of each iteration, are iteratively recalculated in accordance with the appropriate wetness-dependent brush stroke algorithm.

Figure 4:
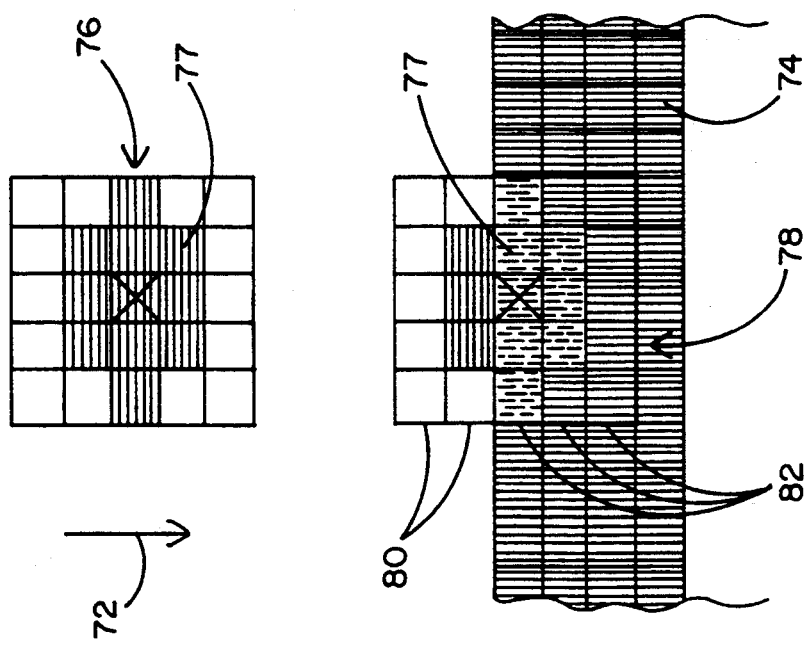
FIG. 4 is a pixel diagram illustrating color mixing on the palette.

Consider, as a matter of example, a stroke of blue color drawn in the direction of arrow 72 (FIG. 4) by brush 44f across a previously made red stroke 74 on the palette 32. The palette algorithm is the simple non-decrementing averaging algorithm described below. Suppose further that the previous brush stroke 74 contained level twenty red, no blue and no green, while the current brush contains level twenty blue, no red and no green. On the palette 32, the brush strokes do not interact with the palette background, only with each other.

Consequently, in position A of the cursor (the cursor being the center pixel x of pixel block 76), all pixels of the brush pattern 77 in the pixel block 76 (drawn as a 5×5 pixel block for clarity) are changed to level-20 blue in memory 20. As the cursor is moved down in FIG. 4, it may reach the position x by the time the computation of block 76 is completed. The program now begins the computation of block 78. In this computation, the pixels of columns 80 remain at level-20 blue, while the pixels in columns 82 are averaged to form purple (level-20 blue plus level-20 red).

In addition, because the center pixel x is now purple, the brush color of brush 44f is changed to purple, as is the color bar 51 (FIG. 2). In this manner, brush strokes on the palette 32 have the precise effect of creating color mixtures as they would on a real palette. The new color thus produced may be stored in any of the color blocks 42(25) through 42(48) by clicking the "save color" icon in the control block 38 and then selecting the desired color block. The palette can be cleared by clicking "clear palette" in the control block 38.

Figure 5B:
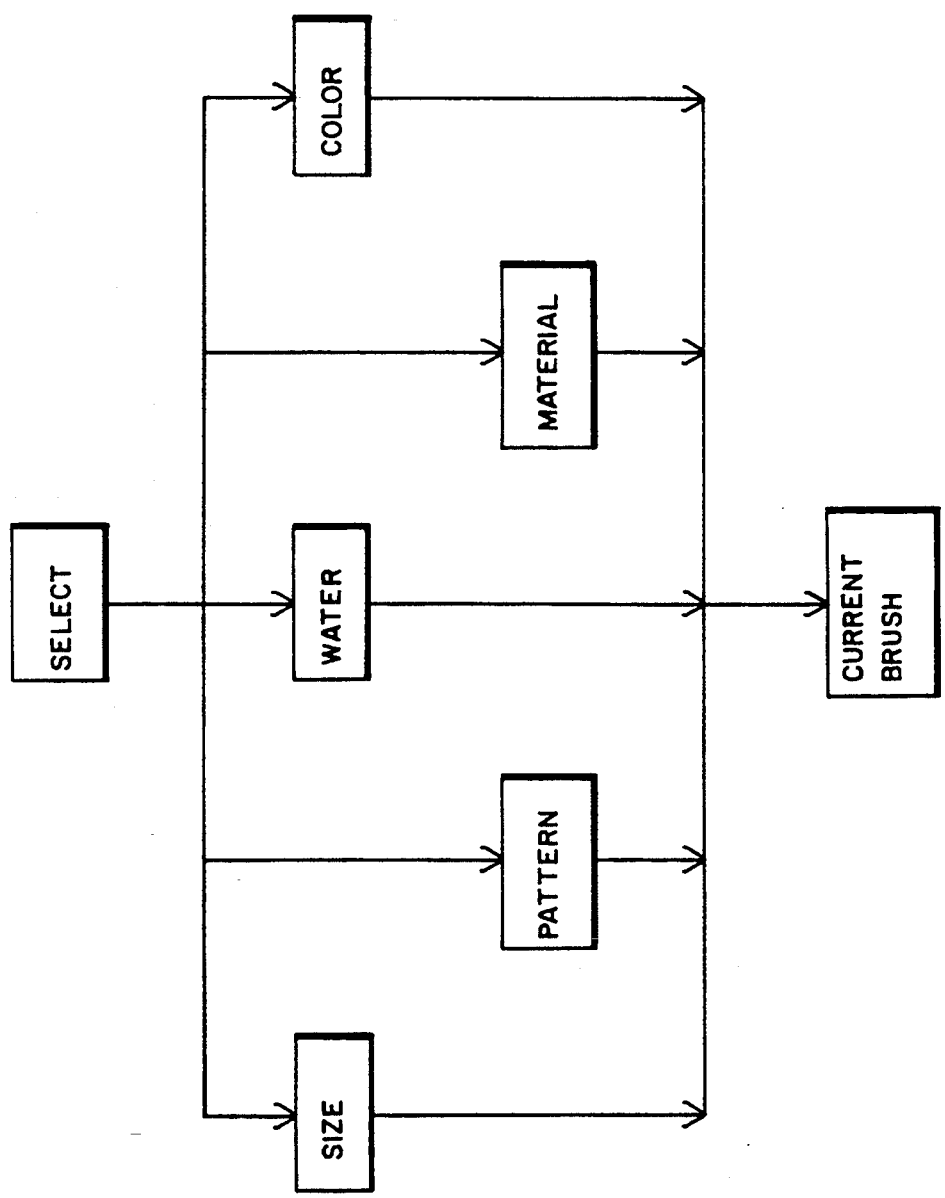
FIG. 5b is a diagram illustrating the selection of brush parameters.
Figure 5A:
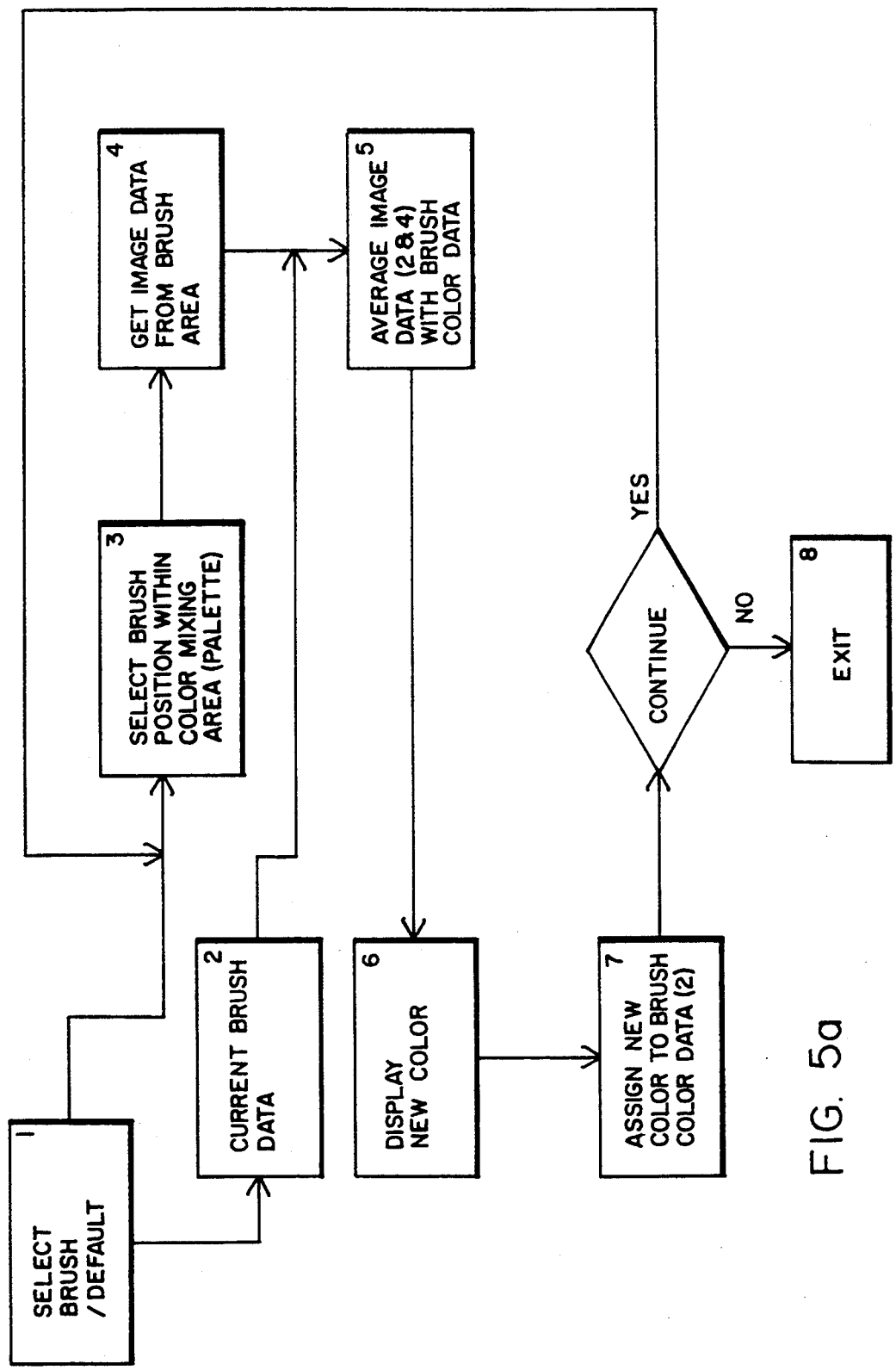
FIG. 5a is a flow chart of the color mixing algorithm.

The color mixing algorithm of palette 32 is illustrated in the flow chart of FIG. 5a. Following selection in box 1 of the brush parameters indicated in FIG. 5b, the selected parameters are stored in the memory 20 (box 2). The mouse 14 is then keyed to select an initial brush position at the then cursor position (box 3), and the existing image information on the palette 32 within the pixel block defined by that brush position is recorded, pixel by pixel, in the memory 20 (box 4).

The brush data and image data are then averaged pixel by pixel (box 5), and the resulting color for each pixel is stored as new image data in memory 20 and is displayed (box 6). The color of the center pixel (the cursor position pixel at the start of the computation) is now substituted (box 7) for the brush color in step 2, and the computation is iteratively resumed at step 3 for the next cursor position until the mouse 14 is released (box 8).

It will be noted that, inasmuch as the computations of FIG. 5a require a finite amount of time dependent upon the speed of the computer 12, there is a limit on how fast the brush can be drawn across the palette before its stroke becomes discontinuous in appearance.

In the case of the palette 32, or whenever the drawing area of screen 70 is set to "dry", the orientation of the brush is not material, and it remains constant during the stroke. However, when screen 70 is set to "moist", the texture selection of icons 64a-64c comes into play, and the brush needs to be constantly reoriented to follow the direction of the stroke.

Figure 6:
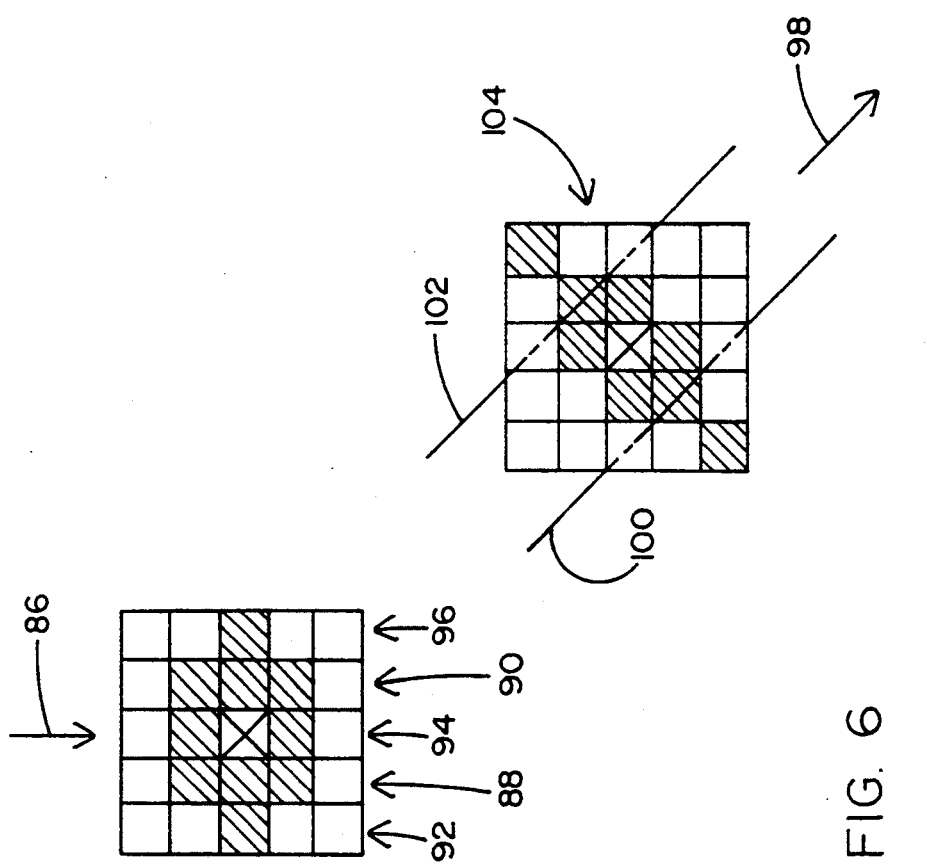
FIG. 6 is a pixel diagram illustrating the effect of the texture brush algorithm.

Referring to FIG. 6, when the brush is moved downwardly (arrow 86) in the texture brush mode, the color level of the pixels in, e.g., columns 88 and 90 is decremented in each iteration of the brush stroke computation at a greater rate than the color level of the pixels in columns 92, 94 and 96. This will create the texture of FIG. 3a toward the end of the brush stroke. If, however, the brush is moved diagonally (arrow 98), it is the pixels on diagonals 100 and 102 that need to be decremented faster than the others to maintain the correct appearance of the texture pattern of FIG. 3a.

Figure 7:
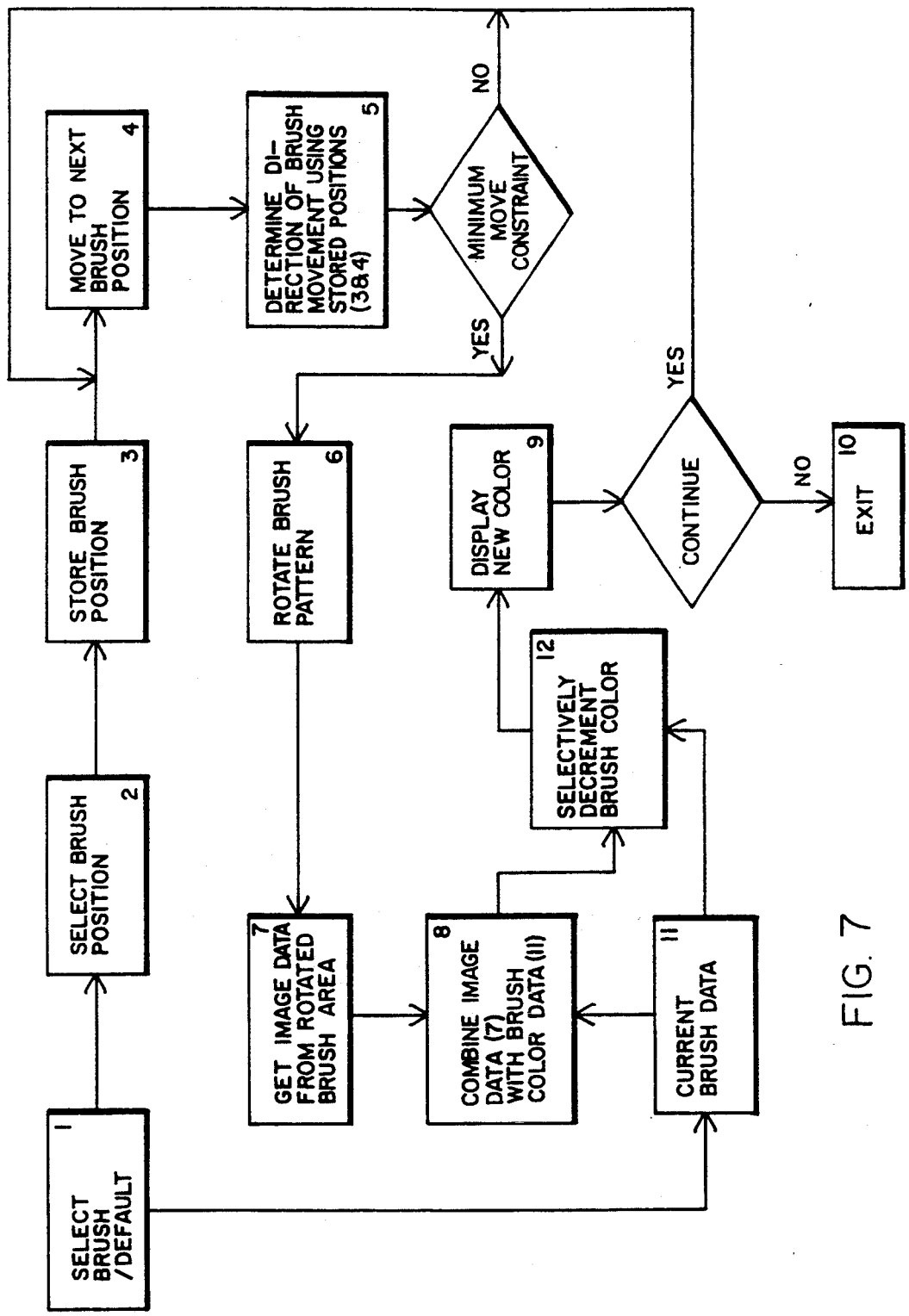
FIG. 7 is a flow chart of the texture brush algorithm of FIG. 6.

The above-described function is accomplished by the algorithm of FIG. 7. In that algorithm, the brush position at each iteration is stored (box 3), and the direction of movement of the brush is determined by comparing the x-y coordinates of the previous position of center pixel x with those of the current center pixel x (box 5). If sufficient movement of the center pixel x has taken place from its last stored position, the new position is stored, and the brush pattern is rotated, as in block 104 of FIG. 6, to conform to the detected direction of movement (box 6). The existing image data and the brush data are then averaged separately as before for each pixel involved (box 8), and the new image information is stored and displayed (box 9). At the same time, the brush color is selectively decremented in appropriate pixels of the brush pattern to produce the selected texture effect of FIGS. 3a–3c (box 12).

When the drawing area of screen 70 is set to "wet", the program simulates a smearing effect in which some of the existing image color is pushed ahead of the brush. This is accomplished by the smearing algorithm of FIG. 8, in which the existing image data at the initial brush position is first stored in a buffer register of memory 20 (Box 3). The existing image data at the next brush position is then interpolated with the stored image data to form new image data (box 6) for the new brush position. This new image data is then combined with the brush data pixel by pixel (box 7) for display and storage in memory.

Mathematically, the interpolation of existing colors in the smearing algorithm of FIG. 8 can be expressed as follows:

$$\text{if}(C1_r > C2_r)$$
$$Cn_r = C1_r - fc_r$$
$$\text{else}$$
$$Cn_r = C1_r + fc_r$$

$$\text{if}(C1_g > C2_g)$$
$$Cn_g = C1_g - fc_g$$
$$\text{else}$$
$$Cn_g = C1_g + fc_g$$

$$\text{if}(C1_b > C2_b)$$
$$Cn_b = C1_b - fc_b$$
$$\text{else}$$
$$Cn_b = C1_b + fc_b$$

where $C1_r$, $C1_g$ and $C1_b$ are the red, green and blue attributes, respectively, of the existing color at the stored brush position; $C2_r$, $C2_g$ and $C2_b$ are these attributes at the new brush position; $fC_r$, $fC_g$ and $fC_b$ are predetermined adjustment factors built into the program, and $Cn_r$, $Cn_g$ and $Cn_b$ are the red, green and blue attributes, respectively, of the new existing color with which the brush color will be averaged at the new brush position. The averaging is done in accordance with the formula $$Cf(r,g,b) = (Cb(r,g,b)f(b) + Cn(r,g,b)f(f(b),f(n)))$$

where $Cf(r,g,b)$ are the red, green and blue attributes of the final color at the new brush position, $Cb(r,g,b)$ are the attributes of the brush color, $f(b)$ is a predetermined computational function associated with the brush color, $Cn(r,g,b)$ are the attributes of the interpolated existing color computed above, $f(n)$ is a predetermined computational function associated with the existing or background color, and $f(f(b), f(n))$ is a predetermined computational function combining $f(b)$ and $f(n)$.

Figure 8:
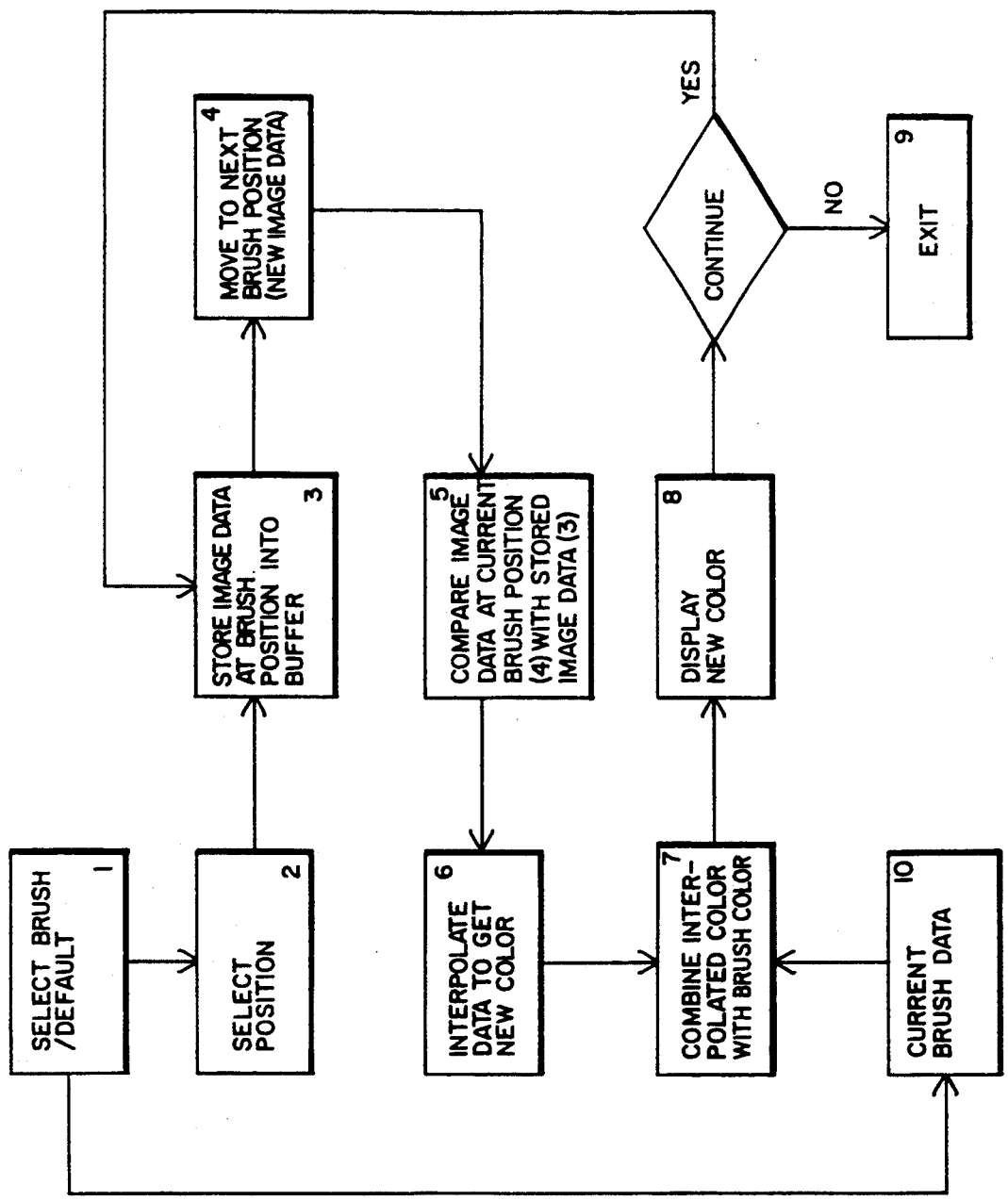
FIG. 8 is a flow chart of the smearing brush algorithm.

In the "very wet" condition of the drawing area of screen 70, the smearing effect of the FIG. 8 algorithm can be supplemented by a bleeding effect created, in a conventional manner, by randomly adding the brush stroke color to pixels outside the brush stroke.

We claim:

1. Apparatus for simulating watercolor effects on a graphics computer having a color screen and a drawing tool for selectively identifying cursor position pixels on said screens comprising:
   a) means for selecting a predetermined wetness level for the watercolor paper represented by said screen;
   b) means for defining a brush shape centered upon said cursor position pixel;
   c) means for selecting a water content parameter and a color content parameter, and a brush color to be associated with said brush shape; and
   d) means for causing said brush shape to produce, along the path of the stroke described by it when said cursor position is moved across said screen, a color effect which is a function of said wetness level, said water and color content parameters, said brush color, and the length of said stroke.

2. The apparatus of claim 1, in which said color effect producing means include means for iteratively calculating, during said stroke, colors for each pixel of said brush shape centered upon the cursor position pixel at the beginning of the iteration, the color of each pixel being calculated as a function of said wetness level, said content parameters, said brush color, said stroke length, and any pre-existing color at the location of the calculated pixel.

3. The apparatus of claim 2, in which the color effect produced by said functions represents at least one of solid color, texture, or smearing effects in watercolors depending upon said wetness level and content parameters.

4. The apparatus of claim 3, in which said color effect involves decreasing said color content parameter in each iteration as a function of said water content parameter so as to simulate the effect of paint thinning and running out as the brush stroke progresses.

5. The apparatus of claim 4, in which said color effect is a texture effect, and said texture effect involves decreasing said color content parameter in each iteration at different rates for different pixels of said brush shape.

6. The apparatus of claim 5, in which said brush shape is oriented in each iteration into alignment with the direction of movement of the cursor position on said screen since a preceding iteration.

7. The apparatus of claim 5, further comprising:
   e) means for selectively varying the average rate of decrease for said brush shape.

8. The apparatus of claim 5, further comprising:
   e) means for displaying on said screen a plurality of texture icons,
   f) means for selecting one of said texture icons; and
   g) means for varying the rate of decrease of said color content parameter for specific ones of said different pixels of said brush shape as a function of the texture icon selected.

9. The apparatus of claim 4, in which said color effect is a smearing effect, and said smearing effect involves, for each pixel of said brush shape in two successive iterations, first interpolating the pre-existing colors of the calculated pixel in said iterations and then interpolating the resulting color with the brush color in accordance with the color content parameter of said brush shape in the second of said iterations.

10. The apparatus of claim 1, further comprising:
e) means for defining on said screen a palette area;
f) means for iteratively calculating during a said stroke within said palette area, colors for each pixel of said brush shape centered upon the cursor position pixel at the beginning of the iteration, by interpolating the existing color of the calculated pixel with said bush color in accordance with the color content parameter of said brush shape during that iteration.

11. The apparatus of claim 10, further comprising:
g) means for changing, at the end of each iteration, brush color to the color of the cursor position pixel calculated during that iteration.

12. The apparatus of claim 1, further comprising:
e) means for displaying on said screen a plurality of color blocks,
f) means for selecting one of said color blocks; and
g) means for assigning the color of said selected color block as the brush color.

13. The apparatus of claim 12, further comprising:
h) means for displaying on said screen at any given time, as the current brush color, the color at that time of the center pixel of the brush shape.

14. The apparatus of claim 13, further comprising means for selectively storing said current brush color in a selected one of said color blocks.

15. The apparatus of claim 1, further comprising:
e) means for displaying on said screen a plurality of brush icons;
f) means for separately storing, for each of said brush icons, attributes including a brush shape, a brush color, a water content parameter, and a color content parameter; and
g) means for selectively making the attributes of a selected icon the current attributes of said brush shape.

16. The apparatus of claim 1, further comprising:
e) means for selectively varying the background color of said paper represented by said screen.

17. Apparatus for producing a brush texture in computer graphics, comprising:
a) means for defining a multi-pixel brush shape on a screen;
b) means for assigning a brush color to said brush shape;
c) means for moving said brush shape across said screen;
d) means for iteratively calculating a color for each pixel of said brush shape in successive positions of said brush shape on said screen; and
e) means for iteratively decrementing the intensity of said brush color at different rates for different pixels of said brush shape.

18. The apparatus of claim 17, in which said brush shape includes a cursor position, and said brush shape is oriented in each iteration into alignment with the direction of movement of said cursor position on said screen since a preceding iteration.

19. The apparatus of claim 17, further comprising means for interpolating, as a part of said calculation, said brush color with a pre-existing color at the screen position of the pixel being calculated, and means for displaying said interpolated color.

20. Apparatus for producing a smearing effect in computer graphics, comprising:
a) means for assigning to selected pixels of a screen a pre-existing color;
b) means for defining a multi-pixel brush shape on said screen;
c) means for assigning a brush color to said brush shape;
d) means for moving said brush shape across said screen;
e) means for iteratively calculating, for successive positions of said brush shape, a color for each pixel of said brush shape, said calculating means including:
  i) means for interpolating for any given brush shape pixel, said pre-existing color at a first position of said brush shape pixel with said pre-existing color at a second position of said brush shape pixel; and
  ii) means for interpolating the thus interpolated color with said brush color; and
f) means for displaying the color produced by said second interpolation as the color of said second position of said brush shape pixel.

* * * * *